(12) United States Patent
Troplin et al.

(10) Patent No.: US 8,440,244 B2
(45) Date of Patent: May 14, 2013

(54) CONCENTRATE OF AN INSTANT CHOCOLATE DRINK AND USES FOR SAME

(75) Inventors: Philippe Troplin, Louviers (FR); Dirk De Clercq, Vosselare (BE); Guy Raybaud, Mantes la Jolie (FR); Jean-Paul LeCoupeau, Venables (FR)

(73) Assignee: Barry Callebaut AG, Zurich (CH)

( * ) Notice: Subject to any disclaimer, the term of this patent is extended or adjusted under 35 U.S.C. 154(b) by 800 days.

(21) Appl. No.: 10/561,590

(22) PCT Filed: Jun. 21, 2004

(86) PCT No.: PCT/FR2004/001545
§ 371 (c)(1),
(2), (4) Date: May 12, 2006

(87) PCT Pub. No.: WO2004/112514
PCT Pub. Date: Dec. 29, 2004

(65) Prior Publication Data
US 2007/0042101 A1    Feb. 22, 2007

(30) Foreign Application Priority Data
Jun. 20, 2003  (FR) ..................................... 03 07506

(51) Int. Cl.
*A23G 1/00*        (2006.01)
(52) U.S. Cl.
USPC .......................................... 426/425; 426/593
(58) Field of Classification Search .................. 426/425, 426/593
See application file for complete search history.

(56) References Cited

U.S. PATENT DOCUMENTS

| | | | | |
|---|---|---|---|---|
| 2,380,158 A | * | 7/1945 | Durrenmatt et al. | 426/262 |
| 2,954,293 A | * | 9/1960 | Rusoff | 426/417 |
| 2,977,231 A | * | 3/1961 | Palley et al. | 426/116 |
| 3,385,710 A | | 5/1968 | Reymond et al. | |
| 3,385,714 A | * | 5/1968 | Smith | 426/575 |
| 3,607,297 A | | 9/1971 | Fasano | |
| 4,435,436 A | * | 3/1984 | Terink et al. | 426/631 |
| 4,871,562 A | * | 10/1989 | Terauchi et al. | 426/330.3 |
| 5,389,394 A | * | 2/1995 | Weyersbach et al. | 426/593 |
| 5,472,719 A | | 12/1995 | Favre | |
| 7,340,990 B2 | * | 3/2008 | Halliday et al. | 99/295 |
| 2003/0033938 A1 | | 2/2003 | Halliday et al. | |
| 2004/0202761 A1 | * | 10/2004 | Kochhar et al. | 426/534 |

FOREIGN PATENT DOCUMENTS

| | | | |
|---|---|---|---|
| EP | 0 449 533 A1 | | 10/1991 |
| EP | 0 512 148 A | | 11/1992 |
| EP | 1 190 959 A | | 3/2002 |
| EP | 1 440 908 A | | 7/2004 |
| GB | 751 121 A | | 6/1956 |
| GB | 1 220 816 A | | 1/1971 |
| JP | 7-213251 | * | 8/1995 |
| WO | 96/34535 A | | 11/1996 |

OTHER PUBLICATIONS

English Translation of the Disclosure of JP 7-213251, published Aug. 1995.*
Chatt E.M, Kertesz, Z.I., "Cocoa, Passage" (1953) Cocoa, Economic Crops, New York, *Interscience*, U.S. p. 207.
Minifie B.W., "Choclate, Cocoa and Confectionary" Science and Technology, Passage, London, Churchill, GB (1970) pp. 48-49.

* cited by examiner

*Primary Examiner* — Anthony Weier
(74) *Attorney, Agent, or Firm* — Hoxie & Associates LLC

(57) ABSTRACT

The invention relates to a method of producing a chocolate drink containing at least 2% cacao. The inventive method includes a step involving inserting a capsule containing a concentrate of the chocolate drink into a coffee machine of the type which allows the pressure percolation of a dose of coffee. The invention also relates to the concentrate which is used to prepare the chocolate drink and to the capsules containing said concentrate.

17 Claims, No Drawings

CONCENTRATE OF AN INSTANT CHOCOLATE DRINK AND USES FOR SAME

The present invention relates to a chocolate drink prepared using an espresso-type coffee machine operating with pre-packaged doses. Its subject is also the means for its production, and more particularly concentrates allowing its preparation and capsules containing such concentrates.

A chocolate drink of this type has been envisaged in Application EP 1 190 959. This application relates to cartridges intended to be used with espresso-type coffee machines. More particularly, this application describes a closed cartridge, intended for extraction under pressure, containing a substance for the preparation of a drink chosen from roasted and ground coffee, tea, soluble coffee, a mixture of ground coffee and soluble coffee, a chocolate product or any other dehydrated edible substance.

The expression "espresso-type coffee machine operating with doses" is understood to mean any machine as designed to carry out percolation under pressure of individual doses of coffee. In the present application, when reference will be made to a coffee machine, this will be a machine of the type described above.

The coffee machines envisaged are intended for percolation. In the present application, the aim is to divert the percolation function to a solubilization function in order to prepare a chocolate drink. The creation of a chocolate concentrate capable of being solubilized by the coffee machine makes it possible to make the latter versatile, it then being possible for the same machine to prepare both coffee and chocolate.

The expression "concentrate" is understood to mean a cocoa extract having the characteristics of a chocolate drink which is at least partially dehydrated.

In the entire application, reference will be made without distinction to the terms: "capsule", "dose" and "cartridge". These three terms will be considered as equivalent, although the terms "capsule" and "cartridge" relate more specifically to a packaging.

The work by the inventors led them to observe that a conventional chocolate powder (for example a commercial cocoa powder), present in a capsule and solubilized by an espresso-type coffee machine, did not make it possible to obtain a satisfactory chocolate drink in terms of taste. Indeed, the chocolate drink obtained contains a fairly low amount of cocoa. This low cocoa content is essentially due to the low solubility of the cocoa contained in the capsule (see Example 2).

The present invention therefore provides a chocolate drink containing at least 2% of cocoa prepared using a coffee machine as designed to operate by percolation under pressure of a coffee dose packaged in a capsule, said capsule containing a concentrate of the chocolate drink.

The chocolate drink according to the invention advantageously contains at least 2.30% of cocoa, preferably at least 2.40%.

The good cocoa content is mainly obtained by virtue of the complete solubilization of the concentrate during the passage of the water under pressure. In the espresso-type machines, this passage time is very short, of the order of a few seconds.

More specifically, the solubility of the concentrate is such that it is completely solubilized by the passage of a maximum of 90 g of water, said water being at a temperature of 60 to 70° C. and at a maximum pressure of $6 \times 10^5$ Pa, said concentrate having a percentage of dry matter of 60 to 90%, inclusive.

This high percentage of dry matter makes it possible to obtain a drink having, in addition to a strong cocoa taste, body and smoothness. This percentage of dry matter is obtained, inter alia, by virtue of the combination of the cocoa powder with the taste enhancer.

The passage times of the water under pressure in the coffee machines vary between 25 and 40 s on average, excluding the time for the rise in pressure. The solubilization of the concentrate should therefore be carried out during this passage time of the water. Preferably, the solubilization will be carried out during a time of 30 to 35 s.

Other physicochemical properties are capable of influencing the cocoa content of the chocolate drink obtained. Preferably, the concentrate has a density of 1.15 to 1.45, inclusive. More particularly, the concentrate is in liquid form. Its viscosity may also be controlled in order to preserve its good solubility. Advantageously, this viscosity may be from 1300 to 2900 mPa/s, inclusive.

In order to increase the solubility of the concentrate, the inventors developed a cocoa taste enhancer. This cocoa taste enhancer is not only very soluble in water but also offers advantages from the taste point of view.

The cocoa taste enhancer is obtained by a process comprising the following stages:
  extraction of commercial cocoa nibs, of cocoa beans and/or of roasted cocoa beans with water, said extraction comprising a maceration stage with stirring for a period of 30 min to 1 h 30 min,
  filtration of the nibs and/or the beans,
  recovering of the juice
  evaporation/concentration/drying of the juice.

The name "cocoa taste enhancer" is understood to mean a water-soluble cocoa extract used in combination with a cocoa powder. This cocoa taste enhancer makes it possible to improve the flavor profile of the cocoa in the chocolate drink according to the invention. Indeed, cocoa extracts do not truly reproduce the flavor profile of the cocoa. The cocoa taste enhancer, used in combination with a cocoa powder, makes it possible to approach the flavor profile of the cocoa and to enhance the taste of the chocolate drink.

For some applications, the cocoa taste enhancer according to the invention will be obtained by a process comprising an alkalizing stage during the maceration and/or a roasting stage after drying the juice.

The alkalizing stage makes it possible to modify the color of the cocoa powder and to change the taste to more intense and more powerful flavors. The color of the cocoa powder is darker, with brown or red shades. As the flavor of the taste enhancer is enhanced, it is possible to use a lower quantity of it in the concentrate of the chocolate drink.

The roasting stage is preferably inserted into the process for the manufacture of the cocoa taste enhancer when the latter is obtained from non-roasted cocoa. Indeed, this heat treatment leads to the development of flavor compounds from flavor precursors developed during the fermentation of cocoa nibs: degradation of proteins, caramelization and the like. The consequence of this stage of the process is to intensify the cocoa flavor and to reduce its bitterness and its pungency.

Consequently, the chocolate drink according to the invention will be preferably prepared from a concentrate containing, in its composition, the cocoa taste enhancer according to the invention.

The invention also relates to the instant chocolate drink concentrates allowing the preparation of the chocolate drink.

Advantageously, these concentrates have a density of 1.15 to 1.45, inclusive, and a viscosity of 1300 to 2900 mPa/s, inclusive. Preferably, said concentrates are in liquid form and additionally contain a cocoa taste enhancer according to the invention.

The cocoa taste enhancer is preferably introduced at a concentration of 1 to 10%, inclusive.

Examples of recipes of concentrates are described in Example 1.

The present invention also relates to the closed capsules of a coffee machine operating by percolation under pressure, containing a concentrate according to the invention. In particular, such capsules have a useful volume of 10 to 40 ml, inclusive, preferably of 20 to 30 ml.

Milk derivatives can also completely or partially replace the whole milk powder. In particular, whey provides a better taste intensity and, from the nutritional point of view, it contributes toward markedly increasing the quantity of minerals present in the drink. The milk material and part of the sugar may also be introduced in the form of condensed milk.

The introduction of emulsifiers such as soybean lecithin makes it possible to enhance the solubility of the concentrate according to the invention.

Recipe table

| Sample | Cocoa % | Cocoa taste enhancer % | Vegetable fat % | Whey % | Sugar % | Whole milk % | Other ingredients % | Water % |
|---|---|---|---|---|---|---|---|---|
| 2* | 9 | 0 | 5** | 2 | 46 | 7 | +*** | 30 |
| 8 | 15 | 0 | 0 | 2 | 43 | 7 | +*** | 30 |
| 12* | 12 | 0 | 5** | 5 | 40 | 7 | +*** | 30 |
| 17* | 12 | 2 | 5** | 5 | 38 | 7 | +*** | 30 |
| 18* | 12 | 1 | 8** | 5 | 36 | 7 | +*** | 30 |
| 19* | 12 | 2 | 8** | 5 | 35 | 7 | +*** | 30 |
| 20 | 15 | 2 | 0 | 2 | 43 | 7 | +*** | 30 |
| 21 | 15 | 2 | 0 | 2 | 42 | 7 | potato starch 2% +*** | 30 |
| 22 | 15 | 2 | 0 | 2 | 42 | 7 | rice starch 2% +*** | 30 |
| 23 | 15 | 2 | 5** | 2 | 38 | 7 | +*** | 30 |

*Use of cocoa powder containing 20/22% fat (non-low-fat cocoa powder). In the other cases, powder containing 10/12% fat is used (low-fat cocoa powder).
**The fat used is copra fat 24/26.
***The other ingredients are salt and flavorings, in particular vanillin.

The use of the espresso-type coffee machines operating by percolation under pressure of a coffee dose packaged in a capsule, for the manufacture of a chocolate drink according to the invention, is also within the scope of the invention. More particularly, such machines are characterized in that they deliver a pressure of at least $4 \times 10^5$ Pa, preferably at least $5 \times 10^5$ Pa.

Other characteristics and advantages of the invention will emerge in the examples which follow.

EXAMPLE 1

Recipes and Data Sheets

A. Recipes

The concentrate according to the invention contains at least the following ingredients: sugar and/or glucose syrup, water, low-fat cocoa powder, whole milk powder, a cocoa taste enhancer and flavorings (salts, vanillin).

The low-fat cocoa powder may be completely or partially replaced with natural cocoa powder or preferably alkalized cocoa powder. In addition, the use of "non-low-fat" cocoa powder enhances the smoothness of the final chocolate drink.

The cocoa taste enhancer makes it possible to increase the solubility of the concentrate and to enhance the taste of the chocolate.

Advantageously, the concentrate according to the invention additionally contains vegetable or animal fat other than cocoa butter. These fats, such as copra or milk fat, give the final drink great smoothness, body and mellowness. Their use in the recipe should however be limited so that the high solubility of the concentrate is maintained.

Alternatively, these fats may be completely or partially replaced by other ingredients such as thickeners, gelling agents (cellulose, methylcellulose), stabilizers (carrageenan, alginate, guar, pectin carboxy-methylcellulose and the like) and/or modified starches.

B. Process of Manufacture

The cold water, the glucose and/or sugar syrup, the whole milk powder and/or the whey are introduced into a jacketed steam cooker under vacuum. The cooking is carried out for 5 to 15 minutes, with a steam of 85 to 90° C., under a vacuum of −0.5 to −0.7×10⁵ Pa.

The cocoa powder, the cocoa taste enhancer and the vegetable fat are then added to the mixture 1, and then another cooking is carried out at 85/90° C. under the same vacuum for 5 to 15 minutes.

The mixture then undergoes a smoothing phase by rapid stirring until a perfectly homogeneous and smooth texture is obtained. The minimum duration of this smoothing phase is about 5 minutes.

The brix of the product is finally checked and then it is packaged in pouches (bag in box) or containers at a temperature of 80±2.5° C.

| Physicochemical characteristics | | |
|---|---|---|
| Criteria | Recipes 17 and 20 | Methods |
| Dry matter | 67 ± 3 brix | Refractive index measured at 20° C. |
| pH | 6.4 ± 0.5 | O.I.C.C.* page 9-E-/1972 |
| Water activity | 0.85 max. | Measured with Rotronic |
| Viscosity | 1000–6000 m/Pa · s | Brookfield at 20° C., N6, speed 20 |
| Density | 1.27 ± 0.05 kg/l | |

| Microbiological characteristics | | |
|---|---|---|
| Criteria | Recipes 17 and 20 | Methods |
| Total microbes | 5000/g | ISO 4833 (1991) |
| Yeast | 50/g | ISO 7954 (1988) |
| Mould | 50/g | ISO 7954 (1988) |
| *Enterobacteriaceae* | 10/g | ISO 7402 (1993) |
| Coliforms | 10/g | ISO 4831 (1991) |
| *E. Coli* | 0/g | ISO 7251 (1994) |
| *Staphylococcus coagulase* | 0/g | ISO 6888 (1987) |
| *Salmonellae* | Abs/750 g | ISO 6579 (1993) |

| Nutritional information | | |
|---|---|---|
| Criteria | Values: recipe 17 | Values: recipe 20 |
| Carbohydrates | 46.1% | 49.3% |
| Lipids | 9.4% | 3.3% |
| Proteins | 5.0% | 5.1% |
| Nutritional values | 289 kcal/100 g or 1207 kJ/100 g | 247 kcal/100 g or 1036 kJ/100 g |

| Shipping and storage conditions | |
|---|---|
| Criteria | Values |
| Transport | <25° C. |
| Storage | <25° C. |
| OUBD | At least 12 months from the date of manufacture |

| Food safety information | |
|---|---|
| Criteria | Values |
| GMO status | The product does not contain any ingredients obtained from genetically modified organisms. |
| Heavy metals | In accordance with Codex Alimentarius |

EXAMPLE 2

Solubilization Tests—Comparison of the Chocolate Drinks Obtained from Capsules Containing a Concentrate According to the Invention or Conventional Cocoa Powder In a 25 ml capsule, the liquid concentrate is compared with a powdered equivalent.

The experiment is carried out on an espresso coffee machine, under the conditions described below:
Outline and Result of the Test

| Capsule | Liquid concentrate | Powdered chocolate product |
|---|---|---|
| Volume: | 25 ml | 25 ml |
| Density of the product in the capsule: | 1.27 kg/l | 0.650 kg/l |
| Weight product in the capsule: | 30 g | 16 g |
| Concentration product: | 70% by weight | 100% by weight |
| Weight dry matter in the capsule: | 21 g | 16 g |
| Conditions machine | | |
| Pressure for injection of water: | $6 \times 10^5$ Pa | $6 \times 10^5$ Pa |
| Temperature of the water: | 70° C. | 70° C. |
| Throughput of the machine: | | |
| Time for rise in pressure: | 12 s | 12 s |
| Time for passage through the capsule: | 33 s | 33 s |
| Quantity of water introduced into the cup: | 90 g | 99 g (90 + 9) |
| Recipe before percolation Cocoa powder: | 14% | 14% |
| Result of the percolation dissolution | | |
| Quantity of dissolution: | 100% | <75% |
| Quantity extracted from the capsule: | 21 g | 12 g |
| Quantity produced in the cup: | 21/(90 + 9 + 21) that is 17.5% | 12/(99 + 12) that is 10.8% |
| Quantity of cocoa powder in the cup: | 2.45% | 1.5% |

Consequently, in the case of the concentrate and for the same quantity of water in the cup, 63% more cocoa is present in the cup in the case of the concentrate according to the invention compared with the powdered product. This demonstrates the greater solubility of the concentrate.

EXAMPLE 3

Cocoa Taste Enhancer

The cocoa taste enhancer may be obtained in two grades:
a so-called alkalized soluble powder
a so-called natural soluble powder The raw material which may be used for the manufacture of the cocoa taste enhancer consists of commercial cocoa nibs, green cocoa beans and/or roasted cocoa beans. Reference will be made to this raw material under the name "bean".

The process is based on a solid/liquid extraction, followed by separation of the phases, concentration and drying.

I. Alkalized Soluble Powder:

a. Treatment of the Bean

The first stage of the process is a liquid/solid extraction. This operation consists of a stage for moistening/alkalizing/macerating the bean in the presence of water. The bean is moistened with a minimum of twice its volume of water. It is preferable, however, to work with a quantity of water equal to 4 or 5 times the volume of the bean.

The alkalizing is carried out with alkaline compounds in a quantity and in a quality defined by European law. Such compounds may be advantageously chosen from alkali metal carbonates, alkali metal hydroxides, magnesium carbonates, magnesium oxides, ammoniacal solutions, as defined in the directive 73/241/EEC of the Council of Jul. 24, 1973, relating to the harmonization of the legislation of the Member States relating to cocoa and chocolate products intended for human consumption. Preferably, potassium carbonate will be used.

This alkalizing operation may be carried out according to two schemes:
  direct alkalizing on the bean at the beginning of the extraction operation, or
  alkalizing after filtration, or directly on the extracted juice.

The maceration may be carried out with slow stirring for a period which may range from 30 minutes to 3 hours, with a preference for 1 hour to 1 hour 30 minutes. The maceration temperature is advantageously between 50 and 100° C., preferably around 80° C.

The extraction is followed by a filtration stage. This operation consists in separating the solid phase from the liquid phase. It may be advantageously carried out with the aid of a bag filter or a hydro-extractor.

The washing of the bean then makes it possible to recover the maximum extract. Several washes of the bean, carried out with water, may be necessary. Each wash fraction is then recombined with the first extraction juice.

At the end of these different stages, a juice containing the extracted cocoa is obtained. This juice constitutes the base for the cocoa taste enhancer.

b. Treatment of the Extracted Juice

The extracted juice first of all undergoes an evaporation-concentration. This operation consists in removing most of the water. In order to obtain a concentrated syrup, it is necessary to work between 50 and 100° C. under reduced pressure.

The concentrated syrup obtained is then dried, according to the alternative drying processes described below:
  i. spray-drying in a tower, production of a granulated or non-granulated powder;
  ii. drying in a drum dryer: production of a powder in the form of flakes;
  iii. oven drying: production of a crystallized mass requiring grinding so as to be converted to a powder.

In the case of drying which is not satisfactory in terms of the organoleptic characteristics, such as roasted taste, additional roasting may be necessary. This is then advantageously carried out with the aid of techniques using hot air. By way of example, such techniques may be chosen from the following techniques: fluidized bed, twin screw heating jacket, double reactor heating jacket, oven, coffee roaster and the like.

II. Natural Soluble Powder:

The process is identical to the process described above, in its implementation, with the exception of the alkalizing stage, which is omitted.

EXAMPLE 4

Production of a Capsule

Before being packaged in capsules, the concentrate is stored in a 1000 kg container, sealed after filling. The shelf life of the product under these conditions is at least 12 months, stored at a temperature of less than 25° C. The container valve is also steam-sterilized. The container is emptied with the aid of a pump.

Alternatively, the product may be stored in bags. In this case, the valve must be sterilized, preferably with isopropyl alcohol or another sterilizing solution.

The packaging machine is put in overpressure with sterile air. Likewise, all the equipment is disinfected. The tube connecting the container to the packaging machine is also steam-sterilized (30 min, 120° C.).

The capsules used to hold the concentrate according to the invention are made of pure or multilayered materials in order to protect the content of the capsule against the uptake of moisture and against oxidation with atmospheric oxygen. By way of example, there may be mentioned aluminum, a plastic (PP, PE, PA), a composite (board/aluminum/plastic), EVOH, PVDC, PET and the like. Such capsules are described in Patent Application EP 1 190 959.

A. Cold Aseptic Filling

Because the content of the capsule is a liquid, the capsules are advantageously filled aseptically and at cold temperature.

Before filling, the capsules must be sterilized. Such a sterilization may be carried out, by way of example, with hydrogen peroxide. Next, the capsules are dried with sterile air.

The capsules are then filled with the concentrate according to the invention. The lid is sealed at 200° C. in order to bring about the sterilization. The space between the liquid level and the lid is replaced with a neutral gas, nitrogen for example.

B. Nonaseptic Filling

Alternatively, the filling may be carried out nonaseptically. In this case, the product is heated to a temperature of at least 75° C. and this temperature is maintained in the capsule for at least 10 minutes. If the product is heated to 85° C., this temperature is maintained in the capsule for at least 15 seconds.

Under these conditions, there is a risk of deviation in the taste and an increase in the viscosity, but it is not necessary to sterilize the capsules.

The invention claimed is:

1. A concentrate of an instant chocolate drink comprising:
  a cocoa taste enhancer produced by a process comprising:
    macerating cocoa nibs in a solvent consisting of water to form a juice,
    recovering the juice, and
    concentrating the juice, and cocoa powder;
  wherein the concentrate is characterized in that 21 g of said concentrate is completely solubilized by the passage of a maximum of 90g of water, said water being at a temperature of 60 to 70° C. and at a maximum pressure of $6 \times 10^5$ Pa, for a percentage of dry matter of 60 to 90%, inclusive.

2. The concentrate as claimed in claim 1, characterized in that it has a density of 1.15 to 1.45 kg/l, inclusive.

3. The concentrate as claimed in claim 1, characterized in that it has a viscosity of 1300 to 2900 mPa/S, inclusive.

4. The concentrate as claimed in claim 1, characterized in that it is in liquid form.

5. A capsule for a coffee machine operated by percolation under pressure, characterized in that it contains a concentrate according to claim 1.

6. The capsule a claimed in claim 5, characterized in that its useful volume is from 10 to 40 ml, inclusive.

7. A process for producing a chocolate drink containing at least 2% of cocoa, comprising the following stages:
  (i) inserting, into a coffee machine operating by percolation under pressure of a dose of coffee, the capsule of claim 5,
  (ii) injecting water in order to solubilize the concentrate, and
  (iii) recovering the chocolate drink.

8. The process as claimed in claim 7, characterized in that said concentrate has a percentage of dry matter of 60 to 90%, inclusive, and 21 g of said concentrate is completely solubilized by the passage, at a temperature of 60 to 70° C. and at a maximum pressure of $6 \times 10^5$ Pa, of a maximum of 90 g of water.

9. The process as claimed in claim 8, characterized in that the concentrate has a density of 1.15 to 1.45 kg/l.

10. The process as claimed in claim 8, characterized in that the concentrate has a viscosity of between 1300 and 2900 mPa/s.

11. The process as claimed in claim 8, characterized in that said concentrate is in liquid form.

12. A chocolate drink comprising the concentrate of claim 1 having at least 2% solubilized cocoa.

13. A concentrate of an instant chocolate drink comprising:
a cocoa taste enhancer produced by a process comprising:
macerating cocoa nibs in a solvent consisting of an alkaline solution to form a juice,
recovering the juice, and
concentrating the juice, and
cocoa powder;
wherein the concentrate is characterized in that 21 g of said concentrate is completely solubilized by the passage of a maximum of 90 g of water, said water being at a temperature of 60 to 70° C. and at a maximum pressure of $6 \times 10^5$ Pa, for a percentage of dry matter of 60 to 90%, inclusive.

14. The concentrate of claim 1 further comprising adding an alkaline compound to the juice.

15. The concentrate of claim 1 having a density of 1.15 to 1.45 kg/l.

16. The concentrate of claim 1 having a viscosity of 1300 to 2900 mPa/s.

17. The concentrate of claim 1 wherein the maceration is at a temperature of between 50 and 100° C.

\* \* \* \* \*

UNITED STATES PATENT AND TRADEMARK OFFICE
CERTIFICATE OF CORRECTION

PATENT NO.       : 8,440,244 B2                                                             Page 1 of 1
APPLICATION NO.  : 10/561590
DATED            : May 14, 2013
INVENTOR(S)      : Troplin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1088 days.

Signed and Sealed this
Eighth Day of September, 2015

Michelle K. Lee
*Director of the United States Patent and Trademark Office*